(12) United States Patent
Rao et al.

(10) Patent No.: US 7,640,458 B2
(45) Date of Patent: *Dec. 29, 2009

(54) SOFTWARE SELF-REPAIR TOOLKIT FOR ELECTRONIC DEVICES

(75) Inventors: Bindu Rama Rao, Laguna Niguel, CA (US); Teck Chia, Aliso Viejo, CA (US); Harri Okonnen, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/401,708

(22) Filed: Apr. 11, 2006

(65) Prior Publication Data

US 2006/0190773 A1    Aug. 24, 2006

Related U.S. Application Data

(63) Continuation of application No. 10/695,524, filed on Oct. 28, 2003, now Pat. No. 7,047,448.

(60) Provisional application No. 60/428,071, filed on Nov. 21, 2002.

(51) Int. Cl.
   *G06F 11/00* (2006.01)
(52) U.S. Cl. .......................................... 714/38; 717/124
(58) Field of Classification Search .................. 714/38, 714/37, 4; 717/124, 126, 128
   See application file for complete search history.

(56) References Cited

U.S. PATENT DOCUMENTS

| | | | |
|---|---|---|---|
| 5,261,055 A | 11/1993 | Moran et al. |
| 5,442,771 A | 8/1995 | Filepp et al. |
| 5,479,637 A | 12/1995 | Lisimaque et al. |
| 5,579,522 A | 11/1996 | Christeson et al. |
| 5,596,738 A | 1/1997 | Pope |
| 5,598,534 A | 1/1997 | Haas |
| 5,608,910 A | 3/1997 | Shimakura |

(Continued)

FOREIGN PATENT DOCUMENTS

CA    2339923    3/2000

(Continued)

OTHER PUBLICATIONS

"Focus on OpenView a guide to Hewlett-Packard's Network and Systems Management Platform", Nathan J. Muller, pp. 1-291, CBM Books, published 1995.

(Continued)

*Primary Examiner*—Dieu-Minh Le

(57) ABSTRACT

A device and method supporting the identification and correction of firmware and/or software errors is described. Upon the occurrence of a firmware/software error or exception, an embodiment in accordance with the present invention may gather parameters for identifying the error or exception, and the execution environment in which the error occurred, and may communicate the parameters or an identifier to a server, to retrieve update information for correcting the firmware/software error or exception. The execution environment may be single or multi-threaded, and may be a java virtual machine. The device may restart/reboot during the update process, and may log an error if update information is not available to correct the error or exception. The device may communicate the error log information to the server via the communication network. The communication network may be a wireless network.

32 Claims, 3 Drawing Sheets

U.S. PATENT DOCUMENTS

| | | | |
|---|---|---|---|
| 5,623,604 | A | 4/1997 | Russell et al. |
| 5,666,293 | A | 9/1997 | Metz et al. |
| 5,704,031 | A * | 12/1997 | Mikami et al. ............ 714/4 |
| 5,752,039 | A | 5/1998 | Tanimura |
| 5,778,440 | A | 7/1998 | Yiu et al. |
| 5,790,974 | A | 8/1998 | Tognazzini |
| 5,826,012 | A | 10/1998 | Lettvin |
| 5,878,256 | A | 3/1999 | Bealkowski et al. |
| 5,960,445 | A | 9/1999 | Tamori et al. |
| 6,009,497 | A | 12/1999 | Wells et al. |
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,178,452 | B1 | 1/2001 | Miyamoto |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 6,530,036 | B1 | 3/2003 | Frey, Jr. |
| 7,058,860 | B2 * | 6/2006 | Miller et al. ............ 714/47 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0053044 | A1 | 5/2002 | Gold et al |
| 2002/0078209 | A1 | 6/2002 | Peng |
| 2002/0116261 | A1 | 8/2002 | Moskowitz et al. |
| 2002/0124209 | A1 * | 9/2002 | Faust et al. ............ 714/37 |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0005362 | A1 * | 1/2003 | Miller et al. ............ 714/27 |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0084283 | A1 | 5/2003 | Pixton |
| 2007/0041545 | A1 * | 2/2007 | Gainsboro ............ 379/188 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

SOFTWARE SELF-REPAIR TOOLKIT FOR ELECTRONIC DEVICES

RELATED APPLICATIONS

This application is a continuation of U.S. patent application Ser. No. 10/695,524, U.S. Pat. No. 7,047,448, entitled "Software Self-Repair Toolkit For Electronic Devices" filed Oct. 28, 2003, which makes reference to, claims priority to, and claims the benefit of U.S. Provisional Patent Application 60/428,071, entitled "Software Self-Repair Toolkit For Electronic Devices" filed Nov. 21, 2002, the complete subject matter of each of which is hereby incorporated herein by reference, in its entirety.

In addition, this application makes reference to U.S. Provisional Patent Application Ser. No. 60/249,606 filed Nov. 17, 2000, PCT Application Ser. No. PCT/US01/44034 entitled "System And Method For Updating And Distributing Information", filed Nov. 17, 2001, U.S. patent application Ser. No. 10/311,462 entitled "System And Method For Updating And Distributing Information", filed May 13, 2003, and U.S. Provisional Patent Application Ser. No. 60/410,071, entitled "Processing System With Component Architecture Platform Support" filed Sep. 12, 2002, the complete subject matter of each of which is hereby incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties.

An update of firmware or firmware components typically involves procedures to be performed in a careful and error free manner. If errors occur, the device may be left in a partially or fully non-functional state. It is desirable to perform such updates using a fault tolerant mechanism. Fault tolerant code, however, is generally complex, and normally difficult to successfully implement.

Attempts to upgrade firmware and/or software in electronic devices, such as mobile phones, are often hampered by limited user interaction capabilities and slow communication speeds on these devices. In addition, when a user determines that there is an error with an electronic device, such as a mobile phones, the user often has limited recourse to having it corrected, and is often left with taking it back to a service center of the manufacturer to have the firmware/software modified or replaced.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A device, system and/or method supporting automatic retrieval of update information to correct abnormal events in an electronic device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

The present invention relates generally to the process of updating software/firmware in electronic devices and, more specifically, to the use of a software self-repair toolkit that facilitates the download of update packages and the subsequent update of firmware/software employing an update package.

Figure 1:
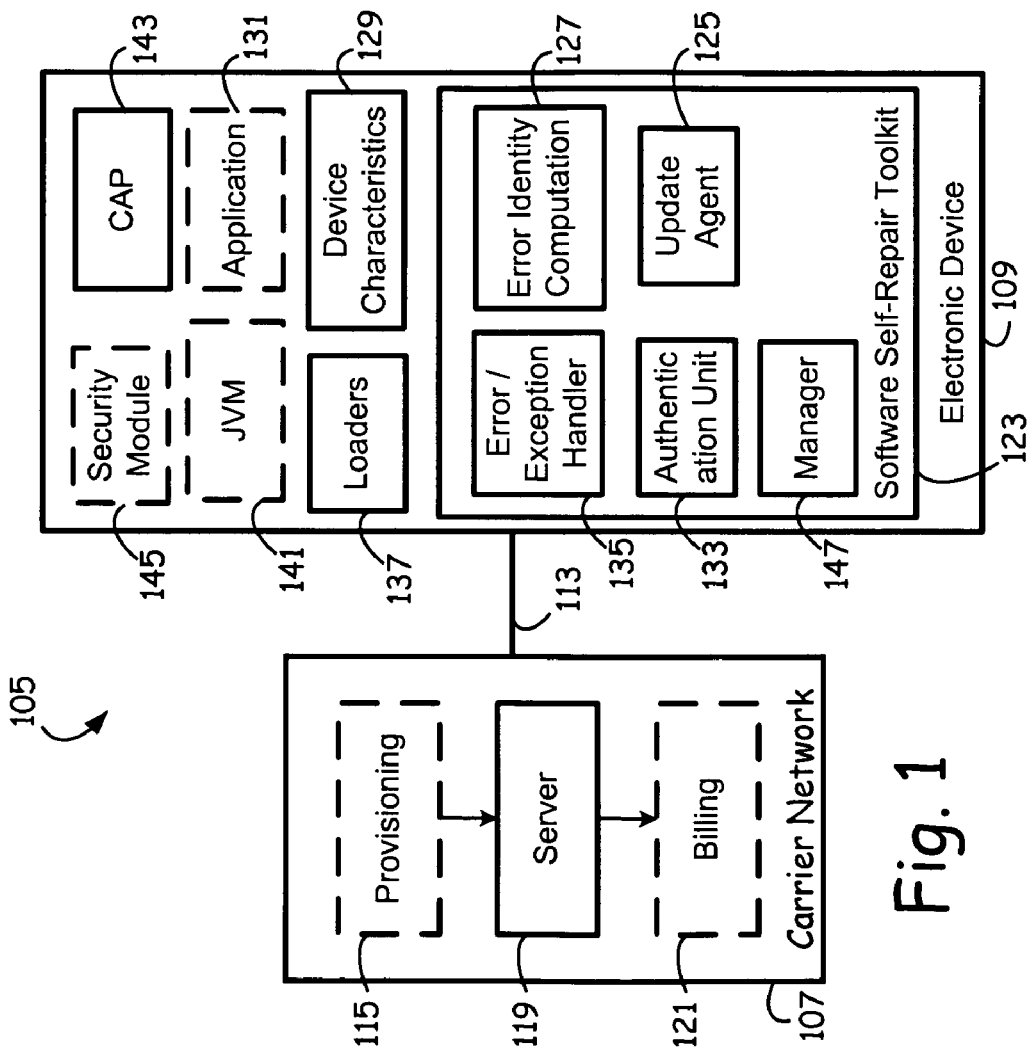
FIG. 1 is block diagram of an electronic device, comprising a software self-repair toolkit, a device characteristics module, a loaders module, a component architecture platform module, an optional security module, an optional application and an optional java virtual machine (JVM), in accordance with an embodiment of the present invention.

FIG. 1 is block diagram of an electronic device 109, comprising a software self-repair toolkit 123, a device characteristics module 129, a loaders module 137, a component architecture platform module 143, an optional security module 145, an optional application 131 and an optional java virtual machine (JVM) 141, in accordance with an embodiment of the present invention. An electronic device such as electronic device 109 of FIG. 1 may employ the software self-repair toolkit 123 to trap errors and/or exceptions encountered during the execution of its firmware/software, and to identify, download, and apply update packages to fix the firmware/software bugs that cause such errors or exceptions.

The software self-repair toolkit 123 of FIG. 1 comprises an error/exception handler module 135, an error identity computation module 127, an authentication unit 133, an update agent 125, and a manager 147. The software self-repair toolkit 123 may employ any of the loaders supported by the loaders module 137 to retrieve update packages from an external system such as, for example, the server 119 of the carrier network 107. The software self-repair toolkit 123 may also store information about downloaded update packages, such that the update agent 125 can retrieve them for subsequent use.

In an embodiment of the present invention, when the electronic device 109 encounters an error and/or exception during execution of elements of its firmware/software (e.g., the java virtual machine (JVM) environment 141, component architecture platform 143, application 131, etc.), the details of the error and/or exception may be saved, and subsequently used to help identify an appropriate firmware/software update, to correct the occurrence of the error and/or exception. An appropriate update package to correct the problem may then be retrieved from a server 119 to which the electronic device 109 is communicatively coupled. The manager 147 of the software self-repair toolkit 123 may coordinate retrieval of the update package based upon one or more parameters such as, for example, parameters used to identify the type of error, parameters used to identify a component or module involved, device characteristics used to identify the device and the device configuration, etc. The manager 147 may retrieve, using the above parameters, one or more update package(s) identified as likely to correct the firmware/software bug causing the error and/or exception. The manager 147 of the software self-repair toolkit 123 may then store status information, set flags, save addresses for the locations where the update package(s) are stored, etc., and may restart/reboot the electronic device 109. The update agent 125 of the software self-repair toolkit 123 may then be employed to apply the update package(s) to the firmware/software of the electronic device 109 (i.e., application 131, JVM environment 141, etc.) The update package(s) may comprise, for example, a set of instructions for converting the firmware/software of the electronic device 109 from a first version to a second version. A description of such an approach may be found in U.S. Provisional Patent Application Ser. No. 60/249,606 filed Nov. 17, 2000, PCT Application Ser. No. PCT/US01/44034 entitled "System And Method For Updating And Distributing Information", filed Nov. 17, 2001, and U.S. patent application Ser. No. 10/311,462 entitled "System And Method For Updating And Distributing Information", filed May 13, 2003, the complete subject matter of each of which is hereby incorporated herein by reference, in its entirety.

The following description addresses three possible scenarios, characterized primarily by the capabilities of the execution environment, i.e. the functionality of electronic device 109. In each of these scenarios, an embodiment of the present invention facilitates the detection and identification of the error, identification and retrieval of appropriate update package(s), and the application of the retrieved update package(s). In addition, an embodiment of the present invention may verify and/or authenticate the update package(s), before the update is performed by the update agent 125.

In one embodiment of the present invention, the electronic device 109 may employ a single threaded environment that becomes partially inoperative when an error and/or exception is encountered. In such a situation, the electronic device 109 may be incapable of retrieving an update package without restarting/rebooting. In an embodiment of the present invention, an exception handler such as the exception handler 135 of FIG. 1 may save an appropriate set of parameters, identifiers, and error details about the error and/or exception that was encountered. The exception handler 135 may select a different combination of parameters, identifiers, and error details based upon the error and/or exception that occurred.

An embodiment of the present invention may employ the error identity computation module 127 to map information about the error to a unique identifier such as, for example, a computed hash value, that may be used to retrieve an update package. The update package is selected for retrieval based upon the likelihood that it will fix the firmware/software bug that caused the error and/or exception to occur. Such an embodiment may also record the occurrence of the error and/or exception for subsequent discovery. After a restart/reboot, an embodiment of the present invention may detect the earlier occurrence of an error and/or exception, access the parameters, identifiers, and error details that were recorded, and retrieve appropriate update package(s). Such an embodiment may use an update agent, such as update agent 125 of FIG. 1, to update the errant firmware/software using the retrieved update package(s). The update agent 125 may then initiate a restart/reboot of the electronic device 109, in order to complete the correction of the firmware/software of the electronic device 109.

In another embodiment of the present invention, the electronic device 109 may employ a multi-threaded operating system. The electronic device 109 may be, for example, a cell phone equipped with the Symbian operating system, as offered by Symbian, Ltd. In such an environment, the software self-repair toolkit 123 of the electronic device 109 may employ the error/exception handler 135 to gather information and/or symptoms of the error and/or exception. An embodiment of the present invention may employ the error identity computation module 127 to either generate an identifier based upon the gathered information and/or symptoms of the error and/or exception, to identify an appropriate update package. In a related embodiment, the software self-repair toolkit 123 may communicate the symptoms and device characteristics 129 to a remote server, such as server 119 in carrier network 107. Communication of the symptoms and device characteristics to the server 119 may allow the server 119 to determine an appropriate update package for the electronic device 109. In either of these embodiments, the software self-repair toolkit 123 may communicate the gathered information/symptoms or the identifier and associated info to the server 119 using a second, independent thread or process for such communication. The software self-repair toolkit 123 may subsequently retrieve appropriate update package(s) employing one of the loaders available in the loaders module 137. One such loader in loaders module 137 may be, for example, a universal resource locator (URL) loader. Following receipt of the appropriate update package(s), the electronic device 109 may employ the authentication unit 133 to verify and/or authenticate the retrieved update package(s), and employ the update agent 125 to apply the received update package(s) to the associated firmware/software of electronic device 109. The software self-repair toolkit 123 may then initiate a restart/reboot of the electronic device 109 to complete the correction of the errant firmware/software.

In yet another embodiment of the present invention, the electronic device 109 may comprise a JVM environment 141 and the software self-repair toolkit 123 may detect error(s) and/or exception(s) encountered by the JVM environment 141 during the execution of programs. When an error occurs or an exception is encountered by the JVM environment 141, the software self-repair toolkit 123 may employ the error/exception handler 135 to gather information and/or symptoms of the error/exception. The software self-repair toolkit 123 may employ the error identity computation module 127 to generate an identifier based on such gathered information (to be used to retrieve appropriate update package(s)), or to communicate the symptoms and device characteristics to a server, such as the server 119 of carrier network 107. The server 119 may then identify one or more appropriate update package(s), retrieve the identified update package(s), and provide the appropriate update package(s) to the electronic device 109. The update agent 125 of the software self-repair toolkit 123 of electronic device 109 may then be employed to apply any update package(s) received.

In a related embodiment of the present invention, stack information retrieved by the printStackTrace( ) method of the JVM environment 141 may be saved by the error/exception handler 135, along with other information related to the error and/or exception. The error identity computation module 127 may then identify and retrieve a java archive (jar) file as an update package. The retrieved update package may be verified and/or authenticated by the authentication unit 133. The update agent 125 may then update the classpath of the JVM environment 141 to incorporate the retrieved jar file.

In a further embodiment of the present invention, a component architecture platform (CAP) module, such as CAP module 143 of FIG. 1, may maintain a catalog of components in the electronic device 109, with details of each component. Component details may include, for example, the starting address, ending address (if appropriate), the size (such as number of blocks), version numbers (major, minor etc.), CRC values, and other related information, for each of the cataloged components in the CAP module 143. A description of one such component architecture platform is provided in U.S. Provisional Patent Application Ser. No. 60/410,071, entitled "Processing System With Component Architecture Platform Support" filed Sep. 12, 2002, the complete subject matter of which is hereby incorporated herein by reference in its entirety. When the update agent 125 of the software self-repair toolkit 123 is to apply a retrieved update package to one of the components of the CAP module 143, the update agent 125 may retrieve component details such as the starting address, CRC values, etc. from the catalog of components maintained by the CAP module 143.

In one embodiment of the present invention, the manager 147 of the software self-repair toolkit 123 may maintain a catalog of known errors or exceptions, and a list of update packages that may be used to fix the known error or exceptions. When the error/exception handler 135 encounters an error or exception, the error identity computation module 127 may compute a unique identifier (e.g., a computed hash value) for the error or exception based upon details of the error or exception (such as stack trace, error messages, error codes, etc.), and may employ the unique identifier to determine whether an update package containing a bug fix exists. The software self-repair toolkit 123 may retrieve the identified update package(s) employing one of the loaders provided by the loaders module 137. The update agent 125 may then be employed to apply the retrieved update package(s) to the firmware/software of electronic device 109. In one embodiment of the present invention, the update agent 125 may be invoked after a reboot of the electronic device 109. The determination of the existence of an update package based on the unique identifier computed by the error identity computation module 127 may be conducted by the manager 147 in a related embodiment of the present invention, and by the server 119 in yet another embodiment.

In an embodiment of the present invention, when a feature of the electronic device 109 is used for the first time, the manager 147 may determine whether a potential firmware/software bug exists. If potential firmware/software error(s) are identified, the manager 147 may then determine whether an update package containing a fix for the identified firmware/software error(s) exists. If the manager 147 determines that an update package is available to correct the firmware/software bug, the manager 147 may automatically retrieve the identified update package from the server 119. The manager may verify and/or authenticate the update package, and apply the update package to the firmware/software of electronic device 109, using the update agent 125. Following correction of the firmware/software error, the electronic device 109 may invoke the feature for the user. Feedback to the user such as, for example, a progress bar, may be displayed during the retrieval of an update package, and during the application of the update package by the update agent 125.

In one embodiment of the present invention, the electronic device 109 may be a mobile handset that may save a small piece of information (such as, for example, a feature identifier) whenever any feature of an application (e.g., a firmware/software component, a device driver, or any application firmware/software) is invoked. For example, a unique feature or application identifier (e.g., a computed hash value) may be saved, along with additional information available at the time of invocation. The unique feature identifier and the additional information may be stored in memory such as, for example, FLASH memory, or other types of non-volatile storage, just prior to invocation of the feature. This saved information may be referred to as a "feature trace". If the mobile handset then becomes inoperable due, for example, to an error or an exception encountered while executing any component of the firmware/software of the feature, the mobile handset may identify the feature that caused the error and/or exception, and take corrective actions. This may be particularly effective if the error and/or exception is flagged, and the saved information is processed during a subsequent restart/reboot. Thus, the fact that an error was encountered in a previous invocation may be displayed when a feature is invoked, along with a prompt to the user to either retrieve an update package that fixes the bug, or to ignore the message and invoke the application or feature despite the warning. In a related embodiment, the update of the application, component, etc. may be accompanied by the simultaneous deletion of the saved feature or application identifier and additional information, in order to avoid warnings to the user after the error-causing bug has been fixed by an update activity.

A feature identifier may be tracked to determine the feature that caused an error or exception while running an application and subsequent invocation of the feature may be preceded by the display of an appropriate warning and an opportunity to retrieve and apply an update package that fixes the bug. In a related embodiment, a combination of an application identifier and a feature identifier may be saved to track where in an application an error or exception occurred. Saving other types of identifiers and related data are also contemplated.

In an embodiment of the present invention, a device characteristics module, such as the device characteristics module 129 of FIG. 1, may support the retrieval of device characteristics that are static, as well as those that are dynamic in nature. Static device characteristics that may be stored in device characteristics module 129 may comprise attributes of a mobile handset such as, for example, a unique identifier (e.g., a computed hash value), manufacturer information, model information, firmware version number(s), hardware version numbers(s), and the like. Dynamic device characteristics that may be stored in a device characteristics module may comprise information such as battery level(s), and communications statistics (e.g., the number of characters transmitted or received, the number of communication errors detected, the ratio of dropped packets in a communication link, etc.)

Figure 2:
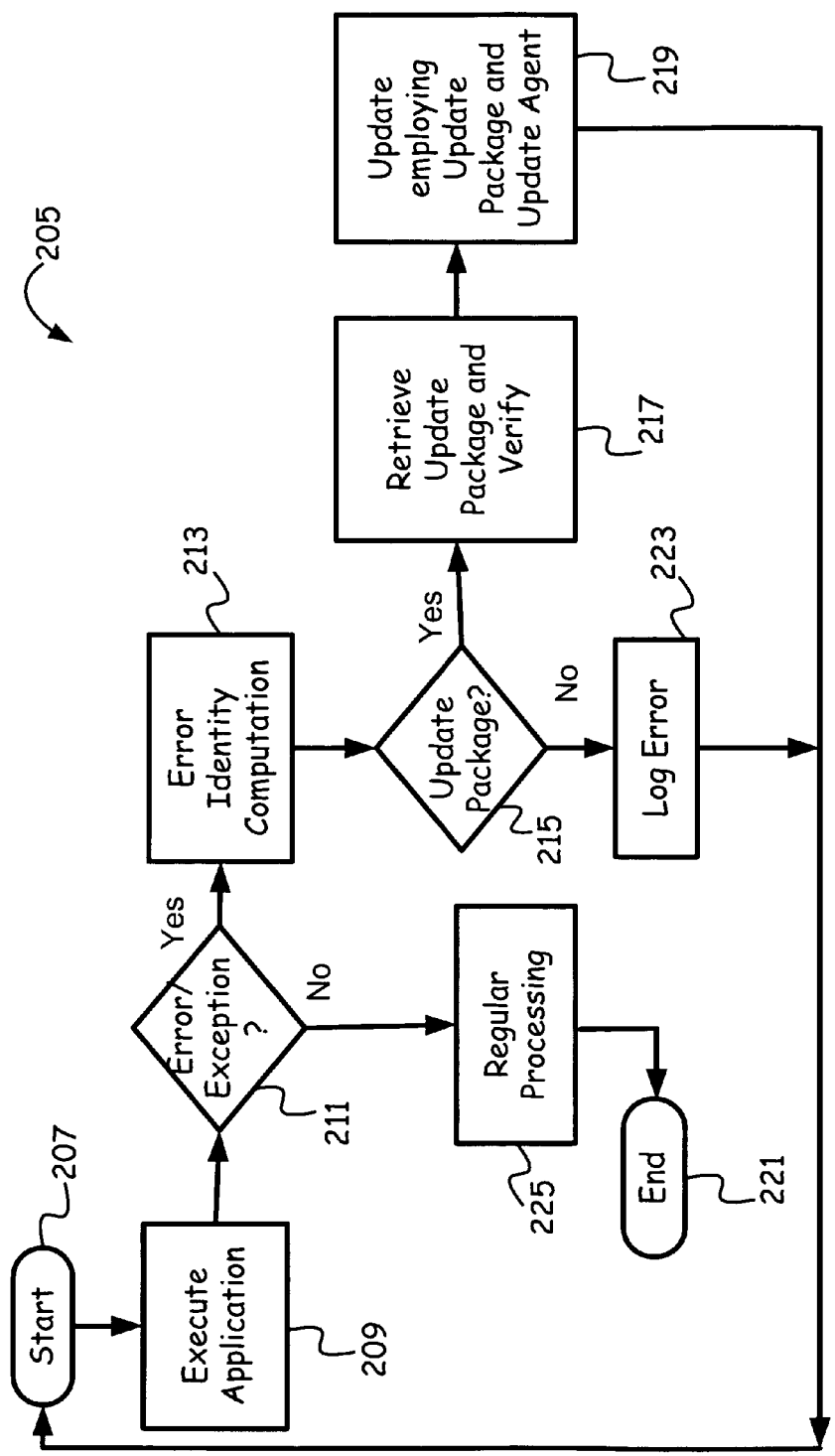
FIG. 2 is a flow chart depicting an exemplary method of operating a software self-repair toolkit, such as the software self-repair toolkit, in an electronic device, such as the electronic device of FIG. 1, in accordance with an embodiment of the present invention.

FIG. 2 is a flow chart depicting an exemplary method of operating a software self-repair toolkit, such as the software self-repair toolkit 123, in an electronic device, such as the electronic device 109 of FIG. 1, in accordance with an embodiment of the present invention. In the method illustrated in FIG. 2, when an error or exception is encountered, the software self-repair toolkit in the electronic device retrieves an update package and applies the update package to fix the error or exception encountered. The operation of the electronic device begins when it is powered-up or restarted/rebooted (block 207). Next, the execution of an feature/application is started (block 209). This typically occurs based upon user input. Then, the occurrence of an error or exception is determined (block 211). If it is determined that an error or exception has not been encountered, the regular processing of the feature/application is executed (block 225), and then feature/application processing terminates (block 221).

If it is determined that an error or exception has been encountered (block 211), then an error identity computation module, such as error identity computation module 127 of FIG. 1, may generate or compute a unique identifier (block 213). The error identity computation module 127 may employ an error code, error message and/or stack trace information to generate or compute the unique identifier (e.g., a computed hash value) that is subsequently employed to determine if an update package exists at a server, such as server 119. The unique identifier may be used to retrieve an update package containing a bug fix for the encountered error or exception. In another embodiment of the present invention, the error identity computation module 127 may gather an error code, error message and/or stack trace information and communicate that to a server. The server may use the received error code, error message and/or stack trace information for the identification and retrieval of an appropriate update package(s).

Next, an attempt may be made to determine if an update package exists at a server (block 215). For example, in one embodiment, a computed or generated unique identifier (e.g., a computed hash value) may be employed to determine if an update package exists at the server. The unique identifier may be generated by and communicated to the server by the electronic device. Other information, such as device characteristics, may also be communicated. In another embodiment, an error code, error message and/or stack trace information may be gathered and sent to the server, to be used for the identification and retrieval of an appropriate update package(s). If it is determined that an update package does not exist for the error or exception encountered (block 215), then an the error is logged (block 223), and regular processing may resume (block 207). In one embodiment of the present invention, the electronic device may communicate to the server a message containing the logged error, using an appropriate communication link. Examples of appropriate links include wireless application protocol (WAP) links, or http links, employing an appropriate format such as, for example, a SyncML message format. Such protocols may be used over wireless networks such as, for example, cellular or personal communications service (PCS) networks.

If it is determined that an update package does exist (block 215), then the update package(s) is/are retrieved and saved in the electronic device (e.g., in FLASH storage, in a file system such as the one provided by the Symbian operating system, etc.) after the authenticity of the package(s) have/has been verified. Later, the retrieved update package(s) may be used by an update agent, such as update agent 125 of FIG. 1, to update the feature/application software (block 219).

The update agent may also use information about the feature/application maintained by a CAP module, such as CAP module 143. In one embodiment of the present invention, the server may communicate the need to reboot the electronic device once the update process is complete. In such an embodiment, the update agent may be capable of accessing such information and acting on it. At the end of the update process, regular processing of the feature/application resumes (block 207).

Figure 3:
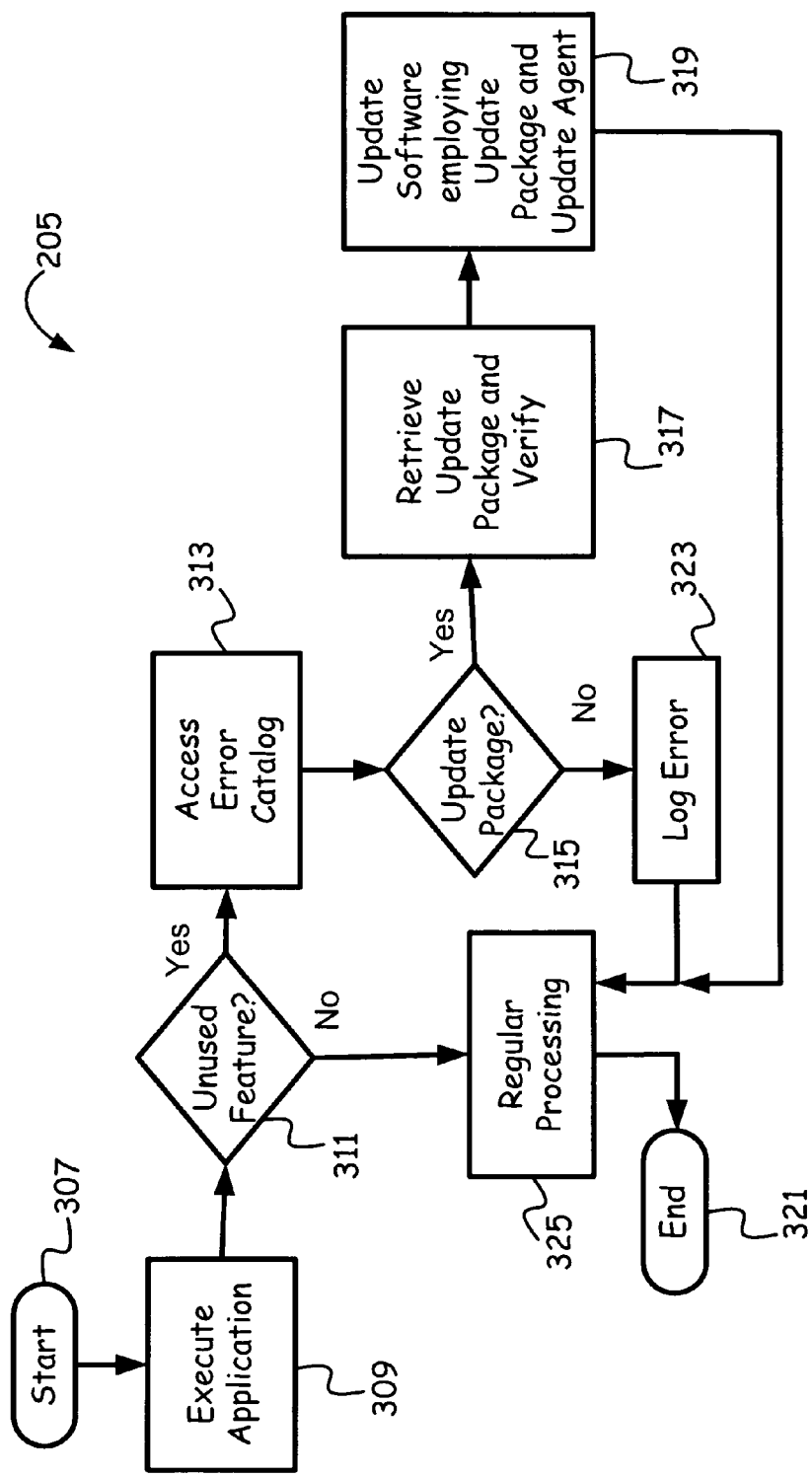
FIG. 3 is a flow chart depicting an exemplary method of operating a software self-repair toolkit of an electronic device, such as the software self-repair toolkit of the electronic device of FIG. 1, when a new feature is invoked for the first time, in accordance with an embodiment of the present invention.

FIG. 3 is a flow chart depicting an exemplary method of operating a software self-repair toolkit of an electronic device, such as the software self-repair toolkit 123 of the electronic device 109 of FIG. 1, when a new feature is invoked for the first time, in accordance with an embodiment of the present invention. In the illustration of FIG. 3, the electronic device attempts to determine whether an error or exception is likely to be encountered and/or a bug fix or update is to be applied. The operation of the electronic device begins when it is powered-up or restarted/rebooted (block 307). Next, the execution of a feature/application is started (block 309). This is normally initiated by user input. Then, the electronic device determines whether a previously unused (possibly new) feature/application is being invoked (block 311). If it is determined that the feature/application being invoked has been used before, the processing for that feature/application is executed (block 325), and then the feature/application processing terminates (block 321).

If it is determined that a feature/application is being invoked for the first time (block 311), then an error catalog may be accessed to identify firmware/software bugs that have been identified for that feature/application, and for which associated update packages may be available (block 313). In one embodiment of the present invention, the error catalog may be maintained by a server, such as the server 119 of FIG. 1. In such an embodiment, a manager, such as the manager 147 of FIG. 1, may communicate with the server to determine if a known error or exception is likely to be encountered when the newly accessed feature is exercised. In another embodiment, the error catalog may be maintained by the manager, and may be accessed to determine whether an error or exception is likely to be encountered.

Next, an attempt is made to determine whether an update package exists (block 315). In one embodiment of the present invention, a unique identifier (e.g., one that is retrieved from the known error catalog maintained in the manager or by the server) may be employed to determine whether an update package exists at the server. In such an embodiment, the unique identifier may be communicated to the server by the electronic device, along with other information (e.g., device characteristics, such as the device characteristics 129 of FIG. 1).

If it is determined that an update package does not exist for an error or exception likely to be encountered in the newly invoked feature/application (block 315), then an error is logged, recording the fact that an update package is not available (block 323). Regular processing of the new feature/application then resumes (block 325). In one embodiment of the present invention, the electronic device may communicate to the server a message containing the logged error, using an appropriate communication link. Examples of appropriate links include wireless application protocol (WAP) links, or http links, employing an appropriate format such as, for example, a SyncML message format. Such protocols may be used over wireless networks such as, for example, cellular or personal communications service (PCS) networks.

If it is determined that an update package does exist (block 315), then the update package(s) is/are retrieved and saved in the electronic device (e.g., in FLASH storage, in a file system such as the one provided by the Symbian operating system, etc.) after the authenticity of the package(s) has/have been verified. Later, the retrieved update package(s) may be used by an update agent, such as update agent 125 of FIG. 1, to update the application software (block 319).

The update agent may also use information about the feature/application maintained by a CAP module, such as CAP module 143. In one embodiment of the present invention, the server may communicate the need to reboot the electronic device once the update process is complete. In such an embodiment, the update agent may be capable of accessing such information and acting on it. At the end of the update process, regular processing of the feature/application resumes (block 307).

In one embodiment of the present invention, the software self-repair toolkit 123 of FIG. 1 may be adaptive in nature, and may keep track of all errors and exceptions encountered, the update packages that have been retrieved and/or applied, the status of the features/applications that have been updated, the information related to components that have been updated, etc.

Aspects of the present invention may be seen in an updatable electronic device comprising a memory having at least one of firmware and software, a first firmware component for determining the occurrence of at least one of an error and an exception during the execution of the at least one of firmware and software, and a second firmware component for gathering at least one parameter related to the occurrence of the at least one of an error and an exception. Such an embodiment may also comprise interface circuitry for receiving update information via a communication network, the update information based upon the at least one parameter, and a third firmware component for applying the update information to at least a portion of the at least one of firmware and software. In an embodiment of the present invention, the at least one parameter may comprise at least one of a type of error, an error code, an error message, a type of exception, an identifier of a component, an identifier of a module, stack trace information, a computed hash value, and a device characteristic. The device characteristic may comprise at least one of a manufacture identifier, a model identifier, a firmware version number, a hardware version number, a battery level, a communication statistic, and a serial number. The device may be a mobile handset, and the communication network may comprise a wireless network. An embodiment of the present invention may comprise a fourth firmware component for generating an identifier for identifying the update information used to correct the at least one of an error and an exception.

In an embodiment of the present invention, the device may transmit the at least one parameter to at least one server via the communication network, the at least one server identifying the update information used to correct the at least one of an error and an exception. In various embodiments of the present invention, the update information may comprise information for retrieving at least one update package via the communication network, and a set of instructions for converting the at least a portion of the at least one of firmware and software from a first version to a second version. At least one of the first firmware component, the second firmware component, and the third firmware component may initiate at least one of a restart and a reboot of the device, and the device may store information related to the at least one of an error and an exception for use after at least one of a power-up, a restart and a reboot of the device. The device may update the at least a portion of the at least one of firmware and software following at least one of a power-up, a restart and a reboot of the device. The at least one of firmware and software may comprise a java virtual machine.

Additional aspects of the present invention may be observed in a method of operating an updatable electronic device comprising a memory containing at least one of firmware and software. Such an embodiment may comprise determining whether at least one of an error and an exception has occurred, continuing regular processing if the at least one of an error and an exception has not occurred, and generating an identifier based upon at least one parameter if the at least one of an error and an exception has occurred. An embodiment of the present invention may also comprise receiving, via a communication network, update information based upon the identifier, and updating at least a portion of the at least one of firmware and software using the update information. The at least one parameter may comprise at least one of a type of error, an error code, an error message, a type of exception, an identifier of a component, an identifier of a module, stack trace information, a computed hash value, and a device characteristic. The device characteristic may comprise at least one of a manufacture identifier, a model identifier, a firmware version number, a hardware version number, a battery level, a communication statistic, and a serial number. The device may be a mobile handset, and the communication network may comprise a wireless network.

In an embodiment in accordance with the present invention, the device may transmit the at least one parameter to at least one server via the communication network, the at least one server identifying the update information used to correct the at least one of an error and an exception. The update information may comprise information for retrieving at least one update package via the communication network, and the update information may comprise a set of instructions for converting the at least a portion of the at least one of firmware and software from a first version to a second version. An embodiment of the present invention may also comprise initiating at least one of a restart and a reboot of the device. In addition, an embodiment of the present invention may comprise storing information related to the at least one of an error and an exception for use after at least one of a power-up, a restart and a reboot of the device. The device may update the at least a portion of the at least one of firmware and software following the at least one of a power-up, a restart and a reboot of the device. Another embodiment of the present invention may comprise logging the occurrence of the at least one of an error and an exception, and communicating, via the communication network, the logged occurrence of the at least one of an error and an exception.

Yet another aspect of the present invention may be found in a method of operating an updatable electronic device. A embodiment in accordance with the present invention may comprise determining that at least one of a firmware and a software error has occurred, gathering at least one parameter related to the at least one of a firmware and a software error, and identifying update information for correcting the at least one of a firmware and a software error. Such an embodiment may also comprise receiving the update information via a communication network, and updating at least one of firmware and software using the update information. The communication network may comprise a wireless network, and the update information may comprise a set of instructions for converting the at least one of firmware and software from a first version to a second version.

Further aspects of the present invention may be observed in a network for updating at least one of firmware and software in at least one updatable electronic device. Such a network may comprise at least one server receiving at least one of device characteristics and an error report from the at least one updatable electronic device, the at least one server retrieving appropriate update information based on the at least one of device characteristics and an error report. The at least one server may communicate the update information to the at least one updatable electronic device using a wireless interface, and the at least one updatable electronic device may use the update information to update the at least one of firmware and software. The update information may comprise an update package having a set of instructions for converting the at least one of firmware and software from a first version to a second version, and the updatable electronic device may comprise a mobile handset. The device characteristics may comprise at least one of a manufacture identifier, a model identifier, a firmware version number, a hardware version number, a battery level, a communication statistic, and a serial number. The updatable electronic device may also comprise a display for displaying information regarding at least one of an error, an exception, and an event to a user. The displayed information may comprise a user prompt to solicit user approval for at least one of the communication of the update information and the update of the at least one of firmware and software.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile electronic device comprising:
    at least one memory comprising one of the following: firmware, software, and configuration information;
    wherein the at least one memory comprises executable code for detecting at least one abnormal event during operation of the mobile electronic device;
    wherein the at least one memory also comprises executable code for gathering at least one device characteristic of the mobile electronic device; and
    wherein the mobile electronic device prompts a user to approve communication of the at least one device characteristic to a remote server, following detection of the at least one abnormal event.

2. The device according to claim 1, wherein the at least one abnormal event comprises one of the following: a power-down, an interruption of operation, a device fault, a corruption during an update process, a firmware or software error, and a firmware or software exception.

3. The device according to claim 1, wherein the at least one device characteristic comprises one of the following: a manufacture identifier, a model identifier, a firmware version number, a hardware version number, a battery level, a communication statistic, usage information, an error, an exception, event information and a serial number.

4. The device according to claim 3, wherein a communication statistic comprises one of the following: a number of communication errors detected, and a ratio of dropped packets on a communication link.

5. The device according to claim 1, further comprising:
    in the at least one memory, executable code for saving information about the at least one abnormal event occurring during invocation of an application in the mobile electronic device; and
    wherein upon subsequent invocation of the application, the mobile electronic device prompts a user regarding the occurrence of the at least one abnormal event, and permits the user to retrieve update information for correcting the at least one abnormal event, or to use the invoked application.

6. The device according to claim 1, wherein the at least one memory further comprises executable code for:
    detecting a first request to invoke one of the following: an application and a feature;
    before invoking, determining whether at least one known error exists for the at least one of the following: an application and a feature; and
    before invoking, retrieving and applying update information, if at least one known error exists and update information for correcting the at least one known error is available.

7. The device according to claim 6, wherein determining whether at least one known error exists comprises:
    referencing a catalog of known errors.

8. The device according to claim 7, wherein the catalog of known errors is resident in the at least one memory.

9. The device according to claim 7, wherein the catalog of known errors is resident in the remote server.

10. The device according to claim 6, further comprising:
    determining whether update information is available for correcting the at least one known error.

11. The device according to claim 6, wherein the update information for correcting the at least one known error is retrieved from the remote server.

12. The device according to claim 6, wherein the update information for correcting the at least one known error is retrieved from the at least one memory.

13. The device according to claim 1, wherein the mobile electronic device comprises one of the following: a mobile handset, a cellular phone, a pager, and a personal computer.

14. The device according to claim 1, wherein the mobile device communicates wirelessly.

15. The device according to claim 9, wherein the wireless communication employs one of the following: a cellular network, a paging network, a local area network, and a wide area network.

16. The device according to claim 1 wherein the update information comprises a set of instructions for converting at least a portion of the at least one memory from a first version to a second version.

17. An electronic device comprising memory containing at least one of the following: firmware and software, the electronic device trapping at least one of the following: an error and an exception, the at least one of the following: an error and an exception encountered during execution of the at least one of the following: firmware and software, and the electronic device automatically identifying, retrieving, and applying update information to correct an error in the at least one of the following: firmware and software, that caused the at least one of the following: an error and an exception.

18. The electronic device according to claim 17, wherein the electronic device comprises one of the following: a mobile handset, a cellular phone, a pager, and a personal computer.

19. The electronic device according to claim 17, wherein identifying comprises automatically gathering symptoms of the at least one of the following: an error and an exception, and generating an identifier used to retrieve the update information.

20. The electronic device according to claim 17, wherein retrieving comprises:
    transmitting at least one device characteristic to a remote server; and
    receiving the update information.

21. The electronic device according to claim 17, wherein update information comprises an update package.

22. The electronic device according to claim 21, wherein the update package comprises a set of instructions executable by the electronic device to convert an existing code version to an updated code version.

23. A method of operating a server for updating code and configuration information in a remotely located electronic device, the method comprising:

automatically retrieving update information for the electronic device using an identifier computed from at least one of the following: a type of an abnormal event and at least one device characteristic;

transmitting the update information to the electronic device via a public network; and wherein the update information is selected for retrieval based upon a likelihood of correction of a cause of the abnormal event.

24. The method according to claim 23, wherein update information comprises one or more update packages.

25. The method according to claim 24, wherein the one or more update packages comprise a set of instructions executable by the electronic device to produce an updated code version from an existing code version, in the electronic device.

26. The method according to claim 23, wherein the identifier is received from the electronic device.

27. The method according to claim 23, further comprising: receiving, from the electronic device, the at least one of the following: a type of abnormal event and at least one device characteristic.

28. The method according to claim 23, further comprising: receiving the identifier from the electronic device.

29. The method according to claim 23, wherein the at least one device characteristic comprises one of the following: a manufacture identifier, a model identifier, a firmware version number, a hardware version number, a battery level, a communication statistic, usage information, an error, an exception, event information and a serial number.

30. The method according to claim 23, wherein the type of an abnormal event comprises one of the following: a power-down, an interruption of operation, a device fault, a corruption during an update process, a firmware or software error, and a firmware or software exception.

31. The method according to claim 23, wherein the public network comprises one of a cellular network, a paging network, a wireless local area network, a wireless wide area network, a wired network, and the Internet.

32. The method according to claim 23, wherein the electronic device comprises one of the following: a mobile handset, a cellular phone, a pager, and a personal computer.

* * * * *